Figure 1:
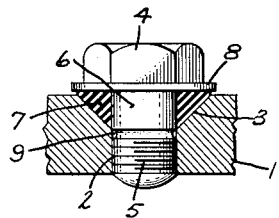

July 12, 1949.　　　　　M. UNGER　　　　　2,476,074

PLUG

Filed Sept. 17, 1945

Inventor:
Magnus Unger,
by Ernest H. C. Britton
His Attorney.

Patented July 12, 1949

2,476,074

UNITED STATES PATENT OFFICE 2,476,074

PLUG

Magnus Unger, Pittsfield, Mass., assignor to General Electric Company, a corporation of New York Application September 17, 1945, Serial No. 616,699

2 Claims. (Cl. 174—152)

1

This invention relates to plugs and more particularly to improvements in threaded gasket plugs.

A well-known type of plug is the so-called pipe thread plug which is characterized by tapered threads. The tapered threads in combination with sealing or thread compound are relied upon to make a tight seal. However, in the case of electrical apparatus, such as transformers which are encased in a steel tank containing hot insulating liquid, such as oil or askarel, under either positive or negative pressure relative to the atmosphere, such pipe plugs are not very satisfactory and even when tightened with a good deal of force they will leak unless the threads are nearly perfect and the thread compound is in good condition and has not dried out or otherwise deteriorated.

In accordance with this invention there is provided what is called a gasket plug which is characterized by straight, as contrasted with tapered, threads, over but a part of the length of the plug, which engage the complementary threads in the opening to be sealed and which has a smooth or non-threaded shank portion adjacent the outer surface of the enclosure which surrounds the opening to be sealed. A gasket surrounds this smooth sided shank portion and beveled means is provided for compressing the gasket both longitudinally of the shank and also radially of the shank so as to form a tight long-lasting but easily renewable seal with the application of but relatively little pressure or force.

I am aware that gaskets have been compressed by beveled surfaces against the threads of a bolt or plug and at first thought it might seem that such a construction is preferable to having the gasket forced radially against a smooth surface because the thread surface, being in effect a zigzag relative to the surface of the gasket material, will provide a greater area of contact and thus should make the seal tighter for a given specific pressure between the plug and the gasket. Unexpectedly, however, I have found that such an arrangement is not as satisfactory as my plug because unless the gasket material is very highly compressed it will not be forced down against the roots of the threads and this is essential for a tight seal because otherwise there will be a spiral passageway between the gasket and the root or bottom of the threads through which a leak can occur. Furthermore, most gasket materials tend to harden or set in time so that if they are pressed into threads on the plug their capability of reuse if the plug is removed for any

2 purpose is very much impaired because there will be relative motion between the threads of the plug and the gasket and this will tend to tear the gasket material.

An object of the invention is to provide a new and improved gasket plug.

A further object of the invention is to provide an improved plug means for sealing a threaded opening in a tank containing electrical apparatus and insulating liquid.

The invention will be better understood from the following description taken in connection with the accompanying drawing and its scope will be pointed out in the appended claims.

Figure 2:
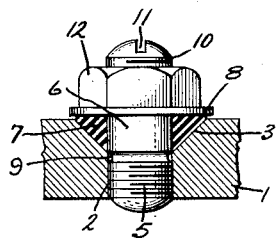
Figure 3:
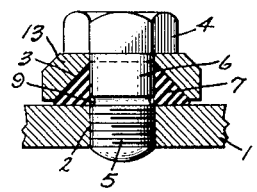
Figure 4:
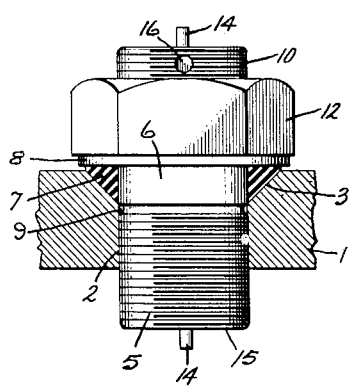
Figure 5:
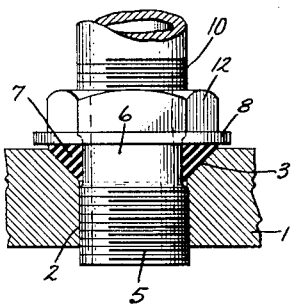
Figure 6:
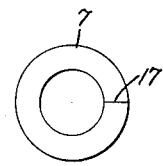
Figure 7:

In the drawing Fig. 1 shows a view, partly in section, of a gasket plug in the form of a bolt, Fig. 2 is a modification in the form of a stud, Fig. 3 is a modification of Fig. 1 in which the beveled surface for compressing the gasket is on a washer instead of countersunk in the material or casing wall having the opening to be plugged, Fig. 4 is a modification in the form of an insulating bushing for a lead-in conductor, Fig. 5 is another modification in which the plug is a pipe or tube, Fig. 7 is a vertical section through a suitable gasket, and Fig. 6 is a plan view of a suitable gasket showing a radial cut therethrough for facilitating application and removal of the gasket.

Referring now to the drawing and more particularly to Fig. 1, a portion 1 of a closed container, such, for example, as the steel wall of a transformer tank, is shown as having a straight threaded opening 2 which is provided at its outer side with a beveled enlargement or countersunk surface 3. Inserted in the opening 2 is a bolt having a head 4 and a shank, the outer end 5 of which is threaded and the inner end 6 of which is straight sided. Compressed between the surfaces of the parts 3 and 6 is a resilient gasket or washer 7 which may originally be of the shape shown in Figs. 6 and 7 in that the cross section of the material forming the ring is rectangular. The gasket may be made of synthetic rubber, for example. Preferably a washer 8 is inserted on the shank against the head 4 of the bolt.

It has been found by test that a one-half inch diameter gasket plug of the type shown in Fig. 1 will, when tightened with the fingers alone, withstand indefinitely a pressure differential of eighty pounds per square inch.

The shank of the bolt is preferably provided with a groove 9 between its threaded portion 5 and its non-threaded portion 6. This is for the purpose of obtaining definite limits of length for the threaded and the smooth part of the bolt.

Fig. 2 differs from Fig. 1 in that the plug is a stud instead of a bolt so that there is a second or outer threaded end portion 10 which is provided with a screw driver slot 11 for turning the stud into the threaded opening 2. A nut 12 is then turned onto the threaded portion 10 for forcing the washer 8 down against the gasket 7 and thus compressing the gasket longitudinally and radially of the smooth sided section 6 of the stud so as to provide a tight seal.

In Fig. 3 the straight threaded opening 2 is not flared or countersunk at its outer end as in Figs. 1 and 2. The necessary beveled surface for providing radial compression of the gasket 7 is formed on a washer 13. Such construction is more suitable than Fig. 1 where the wall 1 of the casing is relatively thin so that the entire opening 2 should be threaded.

In Fig. 4 the plug is a stud as in Fig. 2 but the stud is a tube through the center of which passes a conductor 14 which is held in place by insulating material 15 which may be glass which may be poured into the stud and which upon fusing serves to provide a tight insulating seal for the conductor 14. The upper threaded portion 10 of the stud is provided with a hole 16 into which a rod can be inserted as a wrench for turning the stud into the threaded opening 2.

Fig. 5 is essentially the same as Fig. 4 except that the tubular stud is unfilled and thus acts as a pipe.

It will be observed that in all of Figs. 1–5 inclusive the bolt or stud, as the case may be, may be partially unscrewed sufficiently to allow the gasket or washer 7 to be removed by spreading it open at the cut which is shown at 17 in Fig. 7 and then a new gasket may be slipped over the smooth sided shank portion 6 and the plug tightened down again. In this manner the gasket can be changed with but very little leakage because the plug is not removed entirely and the threaded portions of the parts 2 and 5 stay in engagement.

It will also be observed that the plug or stud may be entirely removed and reinserted readily with minimum damage to the gasket or washer 7 because the latter does not engage any threads.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent, is:

1. A gasket plug for sealing a straight threaded opening in a tank, said opening being beveled and smooth surfaced at its outer edge, comprising a plug having a hollow bore, said plug being provided with an end portion having straight threads for engaging those of said opening, said plug having a smooth straight sided intermediate portion, a resilient gasket surrounding said intermediate portion, an outer threaded end portion on said plug, a plain washer fitted over said outer threaded end portion, a nut threaded onto said outer end portion and turned down so as to force said washer against said gasket, whereby said gasket is compressed against said beveled smooth surface and forced radially against the smooth inner surface of said plug.

2. A gasket plug for sealing a straight threaded opening in a tank, said opening being beveled and smooth surfaced at its outer edge comprising, a plug having a central bore, an insulated electrical conductor passing through said bore, means for sealing said conductor to the walls of said bore, said plug having an end portion with straight threads for engaging those of said opening, said plug having a smooth straight sided intermediate portion, a resilient gasket surrounding said intermediate portion, an outer threaded end portion on said plug, a plain washer fitted over said outer threaded end portion, a nut threaded onto said outer end portion so as to force said washer against said gasket, whereby said gasket is compressed against said beveled smooth surface and forced radially against the smooth inner surface of said plug.

MAGNUS UNGER.

REFERENCES CITED

The following references are of record in the file of this patent:

UNITED STATES PATENTS

| Number | Name | Date |
| --- | --- | --- |
| 897,279 | Fessenden | Sept. 1, 1908 |
| 1,563,836 | Copp | Dec. 1, 1925 |
| 1,720,516 | Hill et al. | July 9, 1929 |
| 2,241,793 | Steven | May 13, 1941 |
| 2,369,939 | Betts | Feb. 20, 1945 |
| 2,417,552 | Ilker et al. | Mar. 18, 1947 |

FOREIGN PATENTS

| Number | Country | Date |
| --- | --- | --- |
| 254,925 | Germany | Dec. 23, 1912 |